United States Patent Office 3,721,135
Patented Mar. 20, 1973

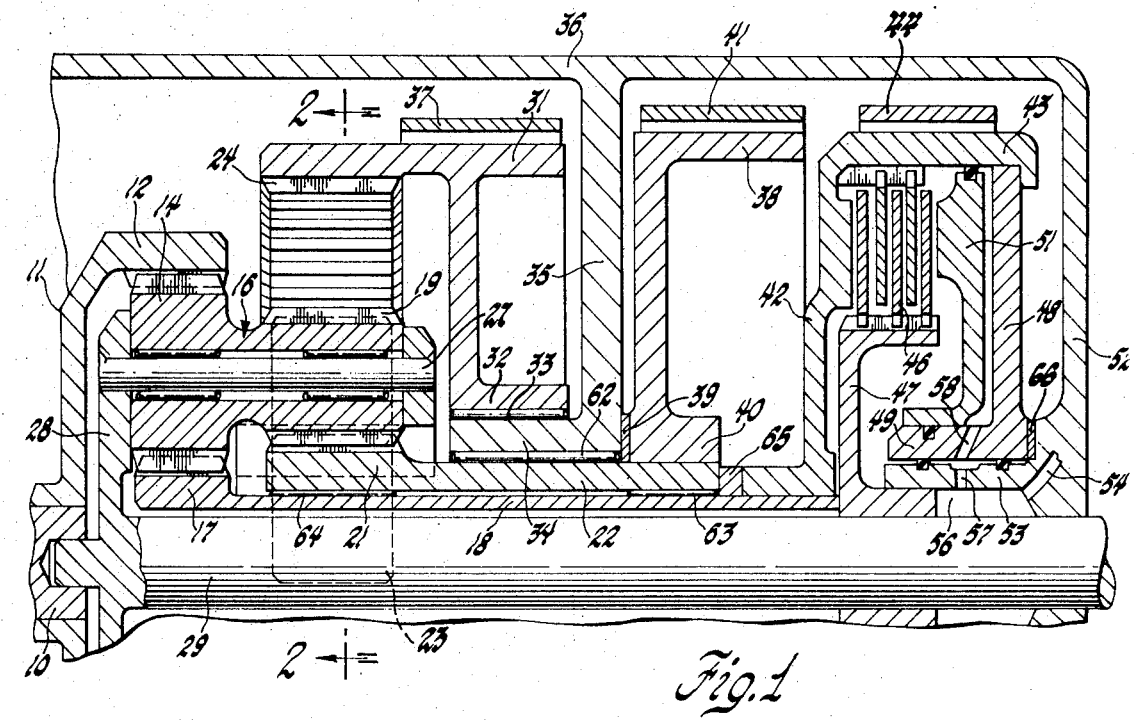

3,721,135
COMPOUND PLANETARY GEARING
Oliver K. Kelley, Bloomfield Hills, Mich., assignor to General Motors Corporation, Detroit, Mich.
Filed Oct. 21, 1970, Ser. No. 82,599
Int. Cl. F16h 57/10
U.S. Cl. 74—761                    12 Claims

ABSTRACT OF THE DISCLOSURE

A compound planetary gearset in which the input ring gear drives the large pinion of a compound planetary pinion and the low brake holds the large sun gear meshing with the small pinion, the second brake holds the small sun gear meshing with the large pinion and the direct drive clutch locks the small sun gear to the output shaft and the reverse brake holds a second ring gear which meshes with a reverse pinion, also meshing with the large sun gear. The small pinion and the large pinion of the compound pinion have the same number of teeth. The small pinion has a small pitch and the gears meshing with it the same small pitch, and the large pinion has a large pitch and the gears meshing with it have the same large pitch. The compound pinions are finish cut by a one piece cutter which simultaneously cuts a pair of teeth, one tooth on the large pinion and one tooth on the small pinion, so the teeth on both pinions of each compound pinion have an identical radial alignment relation to each other and all the compound pinions of the gearset are idential in this relation for equal load sharing.

Figure 3:
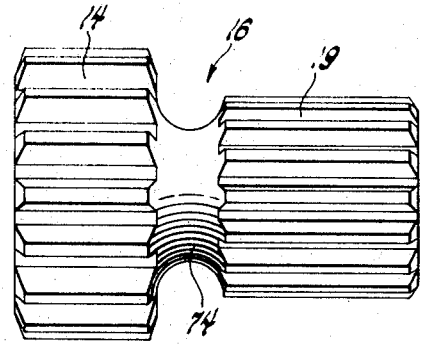

This invention relates to transmission gearing and particularly to a planetary gear set having compound planetary pinions.

While transmissions having integral compound pinions, and an integral pinion having two or more different diameter pinion gears, have been proposed, they have not been commercially used in high production power transmissions because of the difficulty of manufacturing compound gears with sufficient accuracy and likeness for proper load sharing by each of the compound pinions.

The invention is directed to planetary gearing having a plurality of compound pinions in which each of the unitary compound pinions has a small diameter pinion gear and a large diameter pinion gear having the same number of gear teeth. The small pinion has small pitch gear teeth and the large pinion has large pitch gear teeth. The sun and ring gears have the same pitch as the pinion with which they mesh. A unitary or one-piece cutter assembly is employed to simultaneously make the final cut or shave on a large pinion tooth and a small pinion tooth of the compound pinion, so that both the small and the large pinion teeth will have an identical radial alignment relation to each other and the compound pinions will be identical in this relation for equal load sharing. The gear unit provides low ratio when the large sun gear meshing with the small pinion is held. Then the input ring gear drives the large pinion to drive the carrier at a low ratio. For second ratio, the small sun gear meshing with the large pinion is held, and the input ring gear drives the large pinion and carrier at intermediate speeds. For third ratio, the direct drive clutch connects the small sun gear and the carrier output so the input ring gear drives the carrier at 1:1 drive. For reverse, the reverse ring gear is held which, through the interaction of the reverse pinion meshing with the large sun gear and the compound pinion provides, when the input driven ring gear drives the compound pinion, reverse drive out of the output carrier.

An object of the invention is to provide an improved compound planetary pinion gearset to provide equal load sharing by the compound pinions.

Another object of the invention is to provide a compound planetary pinion gearset having a compound pinion gear having the same number of teeth on the large and small diameter pinion gears and the teeth thereof having a pitch proportional to the diameter.

Another object of the invention is to provide a compound planetary pinion gearset having a plurality of compound pinions each having a large diameter and pitch pinion gear and a small diameter and pitch pinion gear each meshing with a central gear having the same number of teeth with each tooth on one pinion gear and a paired tooth on the other pinion gear simultaneously cut by a unitary cutter for an identical radial alignment relationship of the teeth on one gear to the teeth on the other gear of each compound pinion to equalize the load on the compound pinions.

Another object of the invention is to provide a compound planetary pinion gearset having a compound planetary pinion having a large diameter pinion gear meshing with an input ring gear and an intermediate speed reaction sun gear, the small diameter pinion gear meshing with a low speed reaction sun gear and a reverse pinion gear meshing with the low speed reaction gear and a reverse reaction ring gear.

Another object of the invention is to provide a compound planetary pinion gearset having a compound planetary pinion having a large and small diameter pinion gear with the same number of teeth and the large diameter large pitch pinion gear meshing with a large pitch input ring gear and a large pitch intermediate speed reaction sun gear, the small diameter small pitch pinion gear meshing with a small pitch low speed reaction sun gear and a small pitch reverse pinion gear meshing with the low speed reaction gear and a small pitch reverse reaction ring gear.

Another object of the invention is to provide for a compound planetary transmission a compound planetary pinion having a large and small diameter pinion with the same number of small and large pitch teeth respectively and the teeth being simultaneously cut by a unitized cutter reciprocating on one axis to assure that the teeth of both pinion gears have the same radial alignment relationship to each other and that all the compound pinions are identical in this relationship for substantially equal load sharing.

These and other objects of the invention will be more apparent from the following description and drawing of a preferred embodiment.

Figure 4:
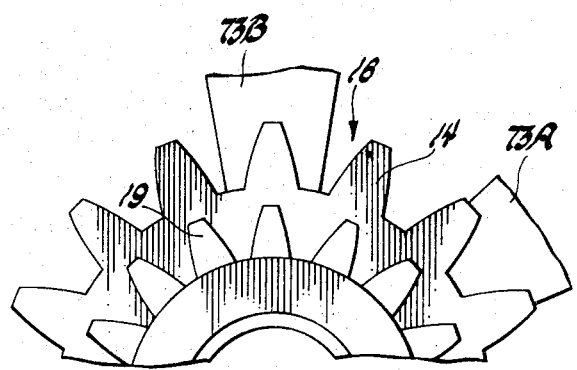
Figure 5:
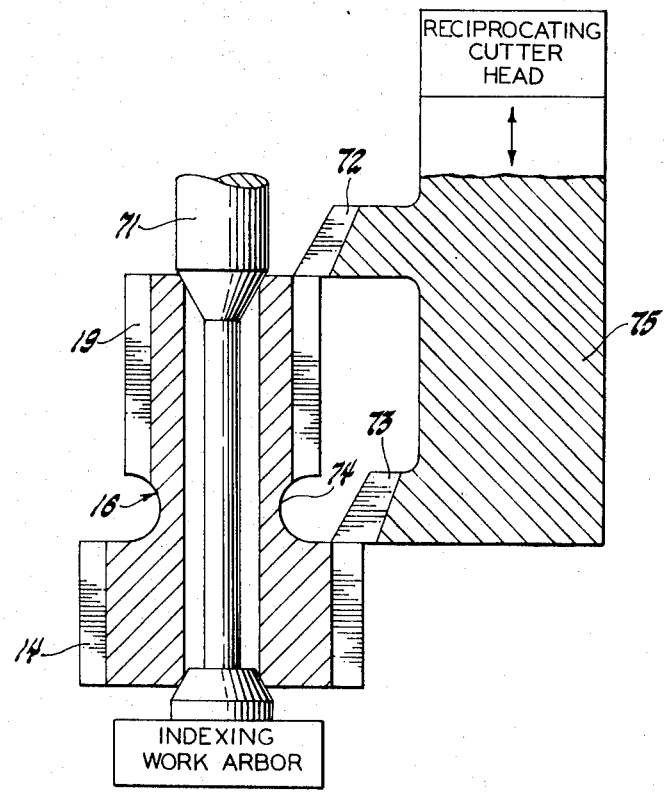

FIG. 1 schematically shows the gearing arrangement.
FIG. 2 is a partial section of FIG. 1 on the line 2—2.
FIG. 3 is a detail view of the compound pinion.
FIG. 4 is a partial end view of the compound pinion.
FIG. 5 schematically shows the compound pinion and the cutters positioned for cutting the compound pinion.

The transmission gearing shown in FIG. 1 has an input shaft 10, preferably driven by a torque converter and driving through the disc 11 the input ring gear 12 of the planetary gear unit. The large pinion gear 14 of each of the compound pinions 16 meshes with the ring gear 12 and the sun gear 17 which is connected by a sleeve shaft 18 to the control described below. Each compound pinion 16 also has an integral small pinion gear 19 which meshes with reaction sun gear 21 connected to the control sleeve 22. The reverse pinion 23 meshes with sun gear 21 and internal ring gear 24 but not with the compound pinion. Three or four sets, each having a reverse pinion 23 and a compound pinion 16, are rotatably mounted by suitable bearings, such as needle bearings, on their respective pinion shafts 26 and 27 which are part of a carrier assembly 28 which drives the output shaft 29. The ring gear 24 has a brake drum portion 31 which may have an internal bearing portion 32 and is suitably mounted by a bearing 33 on a sleeve portion 34 projecting from a central wall 35 of the housing 36. The reverse brake band 37 cooperates with the reverse brake drum 31 to hold the ring gear 24. The low brake drum 38 is drivingly connected by the disc portion thereof to the control sleeve shaft 22 and axially located by a thrust bearing 39 between the drum hub 40 and the transmission wall 35. The low brake band 41 cooperates with the low drum 38 to hold the sun gear 21. The sun gear 17 is connected by the sleeve shaft 18 to the disc 42 of the second speed brake drum 43 which is held by the second speed brake band 44 for second speed. The above brake bands are operated by conventional fluid motors which engage and disengage the reaction brake bands with their respective drums. The direct drive or third clutch 46 has alternate plates splined to the internal surface of drum 43 and intermediate plates splined to the inner drum 47 drivingly connected to the output shaft 29. A cylinder member 48 is secured to the side of drum 43 opposite disc 42 and has an inner cylindrical portion 49 providing an annular cylinder to receive the annular piston 51 between the inner cylindrical portion and the drum. The housing 36 has a rear wall 52 having a cylindrical portion 53 within the cylindrical portion 49 providing a fluid transfer device to supply fluid from a passage 54 in the housing to the space 56 between the housing, the hub of inner drum 47, the transfer passages 57 in the housing and the passage 58 in the rotary cylinder member 48 to supply fluid to the expansible chamber or cylinder therein to engage the clutch. Suitable retraction springs, not shown, disengage the clutch.

Suitable bearings 62 rotatably supporting shaft 22 on the housing and bearings 63 and 64 supporting sleeve shaft 18 on sleeve shaft 22 may be provided. Thrust bearings, 39, 65 and 66, will axially locate the elements.

Engagement of the brake 41 holds the sun gear 21 so the input ring gear 12 drives the carrier 28 and output shaft 29 in the low speed ratio. Engagement of the brake 44 holds the sun gear 17 so the input driven ring gear 12 drives the carrier 28 and output shaft 29 at the second or intermediate speed ratio. Engagement of the clutch 46 locks the sun gear 17 to the output shaft so the input ring gear 12 provides a third speed or 1:1 drive. Engagement of the brake 37 holds the ring gear 24 which, through the interaction of the reverse pinion 23, sun gear 21, and the compound pinion 16, provides when the input ring gear 12 is driving, a reverse drive of the carrier 28 and the output shaft 29. The brake bands and clutch are actuated by suitable servo motors and the clutch and brakes are selectively hydraulically actuated by known fluid controls of the automatic or semi-automatic type.

The compound planetary pinion is a one-piece or integral stepped pinion having a large diameter gear portion 14 of narrow width and a small diameter gear portion having a larger width for equal torque capacity. Both the small diameter pinion 19 and the large diameter pinion 14 have the same number of teeth and thus the small pinion will have small pitch teeth and the large pinion will have large pitch teeth directly proportional to their diameter and circumference. The compound pinion gears 14 and 19 on the compound pinion are rough cut by milling, shaping or hobbing on conventional gear cutting machines. When the finish cut is made on these machines in the conventional manner by separate cutters operating simultaneously or sequentially, the drive mechanism or the mechanism for determining the alignment relationship of the teeth on one gear to the teeth on the other gear, respectively, will result in tolerance variations in the radial alignment relationship of the teeth on one pinion gear to the teeth on the other pinion gear. Thus such variations, called machine tolerance variations, cause a lack of alikeness or identicalness of each compound pinion. While compound gears having both the rough and finish cuts made by these conventional production methods are satisfactory for other gearing arrangements, the small inaccuracies or tolerance variations, i.e. .002", in the radial alignment relationship of the teeth on one pinion gear to the teeth on the other pinion gear of each compound pinion and the lack of alikeness or identicalness of this relationship of the three or four compound pinions in a planetary gear set prevent proper equalized load sharing by the pinions.

In this compound planetary gear set the critical condition occurs in low ratio drive when reaction brake 41 is engaged to hold sun gear 21. Then the input ring gear, a central gear, drives pinion gear 14 through the contacting and loaded teeth and the pinion gear 19 reacts on fixed sun gear 21, a central gear, through the contacting and equally unit loaded teeth. Thus for equalized load sharing, each compound pinion must have a tooth on the large pinion 14 contacting a tooth on the ring gear and a tooth on the small pinion gear 19 contacting a tooth on the sun gear 21. This requires a high degree of accuracy of the relative radial angular position of the teeth on the small pinion gear relative to the large pinion gear of each compound pinion in the planetary gear set. Thus, in order to obtain equalized load sharing by the compound pinions of a compound pinion planetary gear set the radial angular relationship of the teeth on the small pinion gear 19 to the teeth on the large pinion gear 14 must be the same or identical in each of the compound pinions.

In order to obtain this high degree of accuracy of the relative radial angular position of the teeth on both pinion gears, at least a pair of teeth, one tooth of each pinion gear, are simultaneously finish cut by a unitized cutter moving in the same cutting stroke. In compound pinion 16 in this gear set, the loaded tooth of pinion gear 14 is diametrically opposite the loaded tooth of pinion gear 19. A unitized cutter assembly, like cutter tool 75 with facing cutters, could be used to simultaneously finish cut in pairs these two loaded teeth, or at least corresponding surfaces thereof, on opposite sides of the compound pinion, so the above described loaded teeth, one tooth on pinion gear 14 and a diametrically opposite tooth on pinion gear 19, are simultaneously cut. A simpler cutter tool 75, for simultaneously cutting two substantially aligned teeth, one on each pinion gear, will provide the desired degree of accuracy. The rough cut compound pinion is fixed on, or clamped on, a conventional indexing rotary work holder or arbor 71 of a gear shaping machine. A shaper, either vertical or horizontal, having a work or gear holding table or arbor which accurately indexes one tooth space at a time to position each tooth in cutting positions for finish cutting or shaving by a tool formed to cut a single tooth mounted on a tool head reciprocated on an axis parallel to the arbor axis is used. A gear shaper machine like the G. Fisher Pat. 2,246,671 issued June 24, 1941, the E. W. Miller Pat. 2,372,596 issued Mar. 27, 1945 and similar commercially available gear shaper machines may be used. A unitary or one-piece cutter blade tool 75 having cutter 72 for pinion gear 19 and cutter blade 73 for pinion gear 14 is mounted on the reciprocating cutter head and when the compound pinion 16 is indexed in cutting position, the reciprocating cutter head moves in a cutting stroke and as shown cutter 73, having a cutter shape 73a to finish cut the adjacent faces of two adjacent teeth of pinion gear 14 and cutter 72 having a similar cutter shape to finish cut the adjacent faces of two adjacent teeth of pinion gear 19 simultaneously initiate and move through a cutting stroke finish cutting these aligned corresponding gear tooth contact surfaces in identical radial alignment relation to each other. Both cutters may also be shaped as at 73b to cut both sides of the same tooth.

The recess 74 between the teeth of the pinion gears 14 and 19 provides clearance for the cutter 72 to finish the teeth of gear 19 to the end adjacent gear 14. Both cutters 72 and 73 are fixed on one cutter tool member 75 which is mounted on a reciprocating cutter head of a gear shaper for reciprocating movement in the gear shaper to simultaneously cut pairs of contact surfaces, at least one surface on each gear of the compound pinion 16. Since the indexing mechanisms are very accurate and a single unitary cutter tool or member, having two cutters mounted in fixed or rigid peripheral relationship thereon, simultaneously or in the same operating stroke cuts a corresponding contact surface on the teeth of both the small pinion gear 19 and the large pinion gear 14, the gear teeth, especially their contact surfaces, of each pinion gear of the compound pinion 16 will be more accurately peripherally related to each other or have identical radial angular alignment relationship to each other and each compound pinion will have this identical relationship, since they are cut by the same two cutter blade rigid cutter assembly, for simultaneous tooth engagement of one pinion gear with meshing ring gear and the other pinion gear with the meshing sun gear of all the compound pinions of each gearset so they equally share the load. The illustrated cutter assembly has two cutter blades but other conventional cutters, i.e. shavers, polishers, etc. may be used on the rigid cutter assembly. It is important that the gears have the same number of teeth and that the same number of corresponding tooth contact surfaces on both the large and small pinion gears be cut at the same time by a rigidly unitized dual cutter assembly for identity of angular relation of the surfaces of all gears on each compound pinion and all compound pinions. Thus the compound pinions have all the contact surfaces consisting entirely of corresponding pairs of concurrently two cutter co-formed identical angularly related contact surfaces, at least one on the small pinion gear and one on the large pinion gear, and each pinion has identical angularly related contact surfaces for equal load sharing. As pointed out above, identical angularly related contact surfaces lack machine produced tolerance variations but have the lower order tool cutter blade or member wear produced tolerance variations due to different wear of the two cutters. Other dimensions of the compound pinions may have the normal larger machine produced tolerance variations.

Since gear machine indexing devices are quite accurate and the tolerance variations thereof are very consistent from gear to gear, such tolerance variations have very little adverse effect on equalized loading because each compound pinion and both pinion gears will have substantially the same tolerance variation from the indexing device.

While the centerlines of the teeth of the large and small pinions of each compound pinion may be radially aligned, the centerlines of the teeth of one may be peripherally displaced a small distance with respect to the centerlines of the teeth of the other uniformly for all compound pinions so the gear impact frequency and significant harmonics thereof of both pinion gears and their meshing central gears, i.e., sun and ring gears, are out of phase. The pinion axis spacing may also be varied for noise reduction.

It will be appreciated that modifications may be made of the above disclosed invention.

It is claimed:

1. In a planetary transmission; gearing means having an input member, an output member, a reaction member, a carrier element connected to one of said members, a plurality of unitary compound pinions each having a large diameter pinion gear and a small diameter pinion gear mounted and coaxially connected for common rotation on the carrier element connected to said one member, a first gear element meshing with said large diameter pinion gear and connected to a second of said members, a second gear element meshing with said small diameter pinion gear and connected to a third of said members, said large and small diameter pinion gears each having the same number of teeth and the large pinion gear having a large pitch and the small pinion gear having a small pitch, said first gear element having teeth having the same large pitch and said second gear element having teeth having the same small pitch; means operatively connected to said reaction member to selectively hold said reaction member of said gearing means to provide one drive and direct drive means having a clutch and connecting means operatively connected to said gearing means to selectively lock up said gearing means for direct drive.

2. The invention defined in claim 1 and said teeth on said large and small diameter pinion gears each having corresponding contact surfaces, one on the large diameter pinion gear corresponding to another on the small diameter pinion gear, having an identical, lacking machine produced tolerance variations, radial angular alignment relationship on all compound pinions sufficiently so that there is substantially simultaneous engagement of the teeth of the large diameter pinion gear and the first gear element and the small diameter pinion gear with the second gear element of all compound pinions for equal load sharing by all the compound pinions.

3. The invention defined in claim 2 and each said one corresponding surface being an axial stroke large gear cutter, of a rigidly unitary large and small gear cutter unit, cut surface and each said another corresponding surface being a same axial stroke small gear cutter, of the same rigidly unitary large and small gear cutter unit, cut surface.

4. The invention defined in claim 2 and centerlines of said teeth on said large and small diameter pinion gears being peripherally displaced sufficiently so that the gear impact frequency and significant harmonics thereof of both pinion gears and their meshing gears are out of phase.

5. The invention defined in claim 1 and said teeth on said large and small diameter pinion gears each having corresponding contact surfaces, one on the large diameter pinion gear corresponding to another on the small diameter pinion gear, having essentially identical and only differential cutter wear produced tolerance variations of the radial angular alignment relationship on all compound pinions sufficient for essentially equal load sharing by all compound pinions.

6. In a planetary transmission; gearing means having an input member; an output member; a reaction member; a carrier element connected to one of said members; a plurality of unitary compound pinions mounted for rotation on the carrier element and each compound pinion having a large diameter and pitch pinion gear and a small diameter and pitch pinion gear coaxially connected with the same number of teeth and the teeth of the large and small pinion gears having all pairs of contact surfaces consisting entirely of corresponding concurrently co-formed identically angularly related pairs of contact surfaces, one on the small pinion gear and one on the large pinion gear and each compound pinion has identically angularly related pairs of contact surfaces for providing equal load sharing; a first gear element having the same pitch as the large diameter pinion gear meshing with said large diameter pinion gear and connected to a second of said members; and a second gear element having the same pitch as the small diameter pinion gear meshing with said small diameter pinion gear and connected to a third of said members; and brake means operatively connected to said reaction member to selectively hold said reaction member of said gearing means to provide one drive and direct drive means having a clutch and connecting means operatively connected to said gearing means to selectively lock up said gearing means for direct drive.

7. In a transmission; an input shaft; an output shaft; a carrier driving said output shaft; a plurality of unitized compound pinions each having a large diameter pinion gear and a small diameter pinion gear coaxially connected for common rotation and rotatably mounted on said carrier; an input ring gear driven by said input shaft and meshing with said large pinion gear; a small sun gear meshing with said large pinion gear; a large sun gear meshing with said small pinion gear; a reverse ring gear; a reverse pinion gear rotatably mounted on said carrier and meshing only with said large sun gear and said reverse ring gear; reverse brake means operatively connected to said reverse ring gear for selectively holding said reverse ring gear for reverse drive; low brake means operatively connected to said large sun gear for selectively holding said large sun gear for low drive; second brake means operatively connected to said small sun gear for selectively holding said small sun gear for second drive and direct drive clutch means operatively connected to said small sun gear and said output shaft for selectively connecting said small sun gear and said output shaft for 1:1 drive.

8. The invention defined in claim 7 and said carrier being connected to said output shaft at the front of said compound pinion gear adjacent said input shaft; said low brake means including a first sleeve shaft connected to said large sun gear and a drum connected to said first sleeve shaft at the rear of said compound pinion gear; said second brake including a second sleeve shaft connected to said small sun gear, extending through said first sleeve shaft and a second brake drum connected to said second sleeve shaft rearward of said first brake drum and said direct drive clutch being located within said second brake and connecting said second brake drum to said output shaft.

9. The invention defined in claim 7 and said large and small pinion gears having the same number of teeth and the large pinion gear, small sun gear and input ring gear have the same large pitch teeth and said small pinion gear, large sun gear, reverse pinion gear and reverse ring gear having the same small pitch teeth.

10. The invention defined in claim 9 and said teeth on said large and small diameter pinion gears each having corresponding contact surfaces, one on the large diameter pinion gear corresponding to another on the small diameter pinion gear, having essentially identical and only differential cutter wear produced tolerance variations of the radial angular alignment relationship on all compound pinions sufficient for essentially equal load sharing by all compound pinions.

11. The invention defined in claim 10 and each said one corresponding surface being an axial stroke large gear cutter, of a rigidly unitary large and small gear cutter unit, cut surface and each said another corresponding surface being a same axial stroke small gear cutter, of the same rigidly unitary large and small gear cutter unit, cut surface.

12. The invention defined in claim 10 and said teeth on said large and small diameter pinion gears being peripherally displaced from each other sufficiently so that the gear tooth impact frequency and significant harmonics thereof of both pinion gears and their meshing gears are out of phase.

References Cited

UNITED STATES PATENTS

| | | | |
|---|---|---|---|
| 2,220,174 | 11/1940 | Ravigneaux | 74—759 |
| 2,761,333 | 9/1956 | Ravigneaux | 74—759 |
| 2,847,877 | 8/1958 | Ravigneaux | 74—759 |

FOREIGN PATENTS

| | | | |
|---|---|---|---|
| 949,075 | 2/1964 | Great Britain | 74—766 |

ARTHUR T. McKEON, Primary Examiner

U.S. Cl. X.R.

74—766